May 15, 1956     A. F. HASBROOK     2,746,034
POSITIONING DETERMINING SYSTEM
Filed June 1, 1951     2 Sheets-Sheet 1
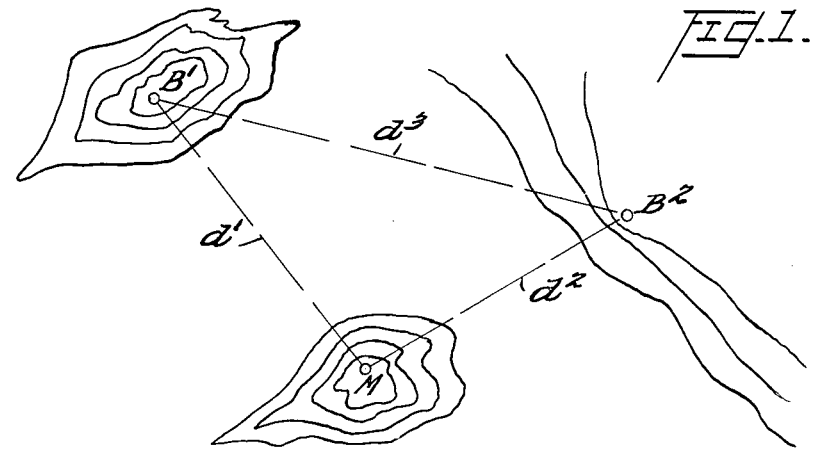
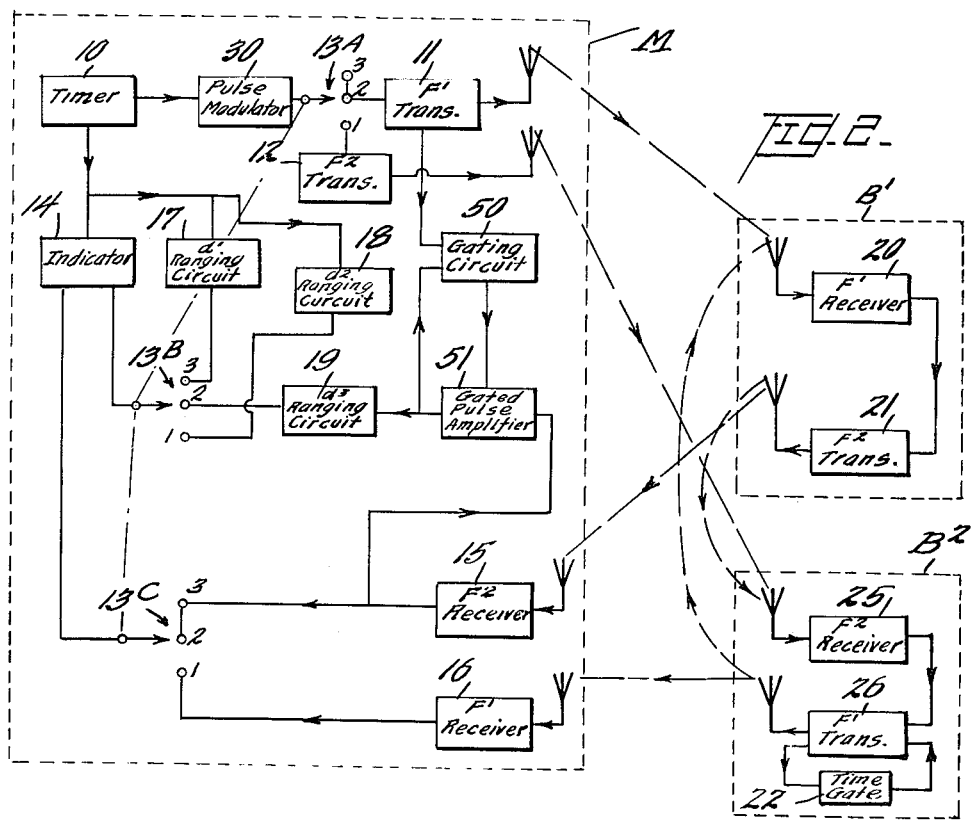
INVENTOR
Arthur F. Hasbrook,
BY Watson, Cole, Grindle & Watson
ATTORNEYS May 15, 1956 A. F. HASBROOK 2,746,034
POSITIONING DETERMINING SYSTEM
Filed June 1, 1951 2 Sheets-Sheet 2
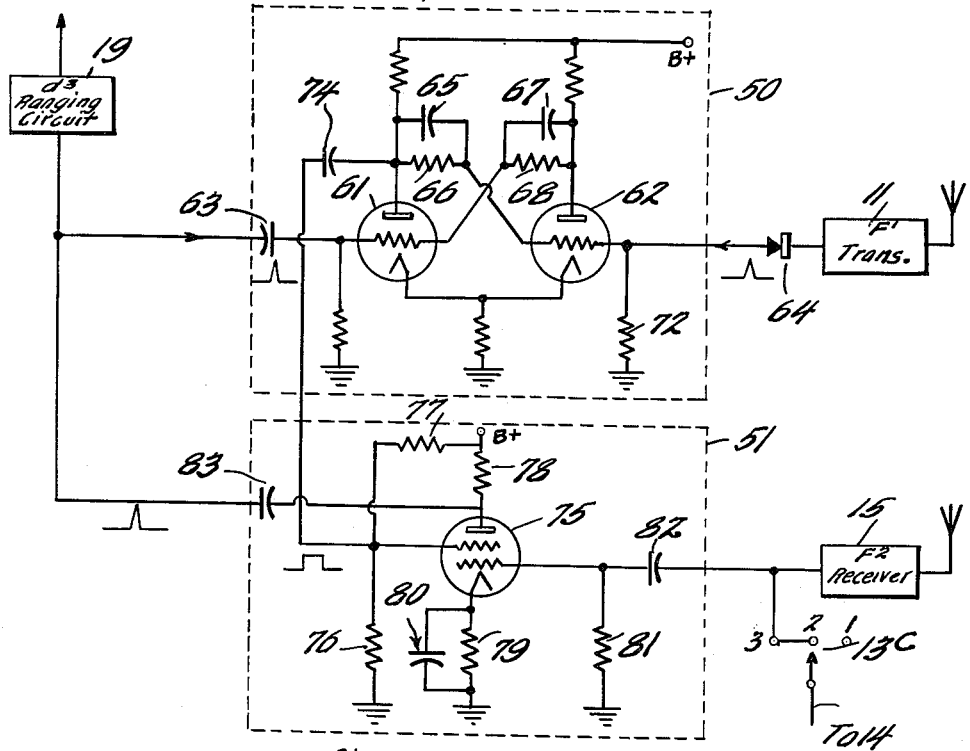
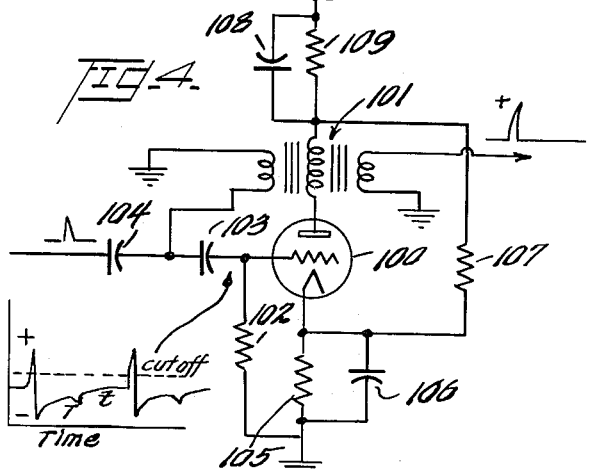
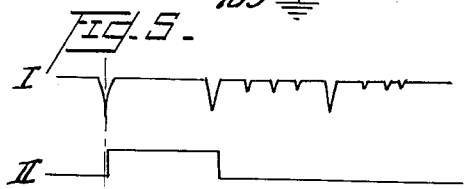
INVENTOR
*Arthur F. Hasbrook,*
BY *Watson, Cole, Grindle & Watson*
ATTORNEYS United States Patent Office 2,746,034
Patented May 15, 1956

2,746,034

POSITIONING DETERMINING SYSTEM

Arthur F. Hasbrook, Bexar County, Tex., assignor to Olive S. Petty, San Antonio, Tex.

Application June 1, 1951, Serial No. 229,362

6 Claims. (Cl. 343—15)

This invention relates to an improved method and apparatus for the electronic measurement of distances, whereby the location of a remote position may be determined. An important feature of the invention is its applicability in locating positions in mountainous terrain and other regions which are difficult of access.

Various electronic systems for locating a remote position with reference to one or more known positions have been heretofore proposed. In one general class of such systems, a master transmitting station located at the unknown position is used in measuring distances to repeater stations at known positions. In another general class of such systems, two master stations at each of two known positions are employed to measure the distances from each to a repeater station at the unknown position. In certain applications, for instance the location of aircraft in space, such systems are fairly satisfactory, but when employed for other purposes, for instance surveying on the earth's surface, and especially in mountainous regions or other areas offering obstacles to transportation of heavy equipment, it is highly desirable to provide a system which is more readily adapted to the terrain.

It is therefore an object of the invention to provide a system of electronic surveying in which the master, or primary transmitting station, may be located at a known and readily accessible position, only simple repeating stations, employing readily portable equipment, being required at other points.

More specifically, it is an object of the invention to provide an electronic surveying system comprising a master station located at a known accessible position, and repeater stations located at two remote points, of which the position of at least one is unknown, the location of the other remote point being determinable by conventional electronic or optical instruments. In the preferred operation of the system, a signal is transmitted from the master station to the more readily located point, from which it is reradiated for reception at the master station as well as at the unknown point, being returned from the latter to the more readily located point and thence to the master station. The returned signals, one series of which has been directly returned from the first remote station and the other of which has traversed the additional distance between the two remote stations, are then utilized at the master station to measure the distance between the two remote stations, preferably by means affording a direct reading of the distance.

The preferred system also contemplates the transmission of signal energy from the remote station at the unknown location to the master station, thus affording a direct measure of the distance between the last mentioned stations.

Further objects and features of the invention will be apparent from the following description taken in connection with the accompanying drawings, in which Figure 1 is a geometrical illustration of an arrangement of several stations, the location of one of which is to be determined;

Figure 2 illustrates schematically a measuring system embodying the principles of the invention and indicating diagrammatically the equipment required at each of the several stations;

Figures 3 and 4 are wiring diagrams of certain components of the equipment at the base or master station;

Figure 5 is a graphical representation of signal energy appearing at various points of the equipment employed at the master station; and Figure 6 is a diagrammatic showing of a modification of part of the system illustrated in Figure 2.

In order to promote an understanding of the invention, reference is made to the specific embodiment thereof illustrated in the accompanying drawings and the same is described in detail hereinafter. It will nevertheless be understood that such modifications and alterations of the invention are contemplated as would normally occur to those skilled in the art to which the invention relates.

Figure 1 illustrates a measuring system of the character illustrated more fully in the remaining figures, consisting of a master station located at M, a first remote or repeater station B1, and a second remote or repeater station B2, it being desired to locate the position of station B2. The three stations define a triangle, of which the sides $d1$, $d2$ and $d3$ represent the distances between the several stations.

In the presently described arrangement, stations M and B1 are at fixed locations such that distance $d1$ remains constant; the direction of $d1$ relative to a known landmark may be determined by other means such as radio or optical angle measuring instruments. Then it is only necessary to measure distances $d2$ and $d3$ for each location of B2 in order to determine the latter's position. Because of the necessity for a high degree of portability of the equipment to be used at B1 and B2, all measurements are made at master station M as follows: Distance $d1$ is measured by transmitting signal energy from M to B1 and return and measuring elapsed time; distance $d2$ is similarly measured by transmission from M to B2 and return. Distance $d3$ is measured by utilizing all three stations; the transmitted energy travels from M to B1 to B2 and returns over the same circuit; thus total distance $d1+d3$ is traversed and, as will be shown shortly, distance $d3$ may readily be obtained by effectively subtracting, in the electronic measuring circuits, the time required for traverse of $d1$.

Turning to Figure 2, in which the various components of the system are represented schematically, it will be observed that signal energy is generated in a device called for convenience a "timer," which may be constituted by any conventional electronic circuit capable of generating timing signals, preferably in the form of signal pulses of constant frequency. An improved circuit for the production of pulsed signal energy and satisfactory for use as a timer 10 in the present system is illustrated and described in my prior application for U. S. Letters Patent, Serial No. 92,884, filed May 12, 1949, although it will be understood that the pulse generating means employed in my system may vary widely. In fact, I may employ, as described more particularly in my prior application for U. S. Letters Patent, Serial No. 84,359, filed March 30, 1949, a sine wave transmission, pulses being formed only after transmission and reception of the signal energy, and then only for the purpose of greater accuracy in measuring. Whether pulses or marked sine waves are employed for transmission, the repetition rate or frequency is, of course, selected to suit the distances involved and the required degree of accuracy.

In any event, it is preferred that the transmission of signal energy be effected by modulated carrier waves, and reference will be made herein, for convenience, to the modulating signal energy supplied by timer 10 as pulsed rather than continuous wave form energy. Consequently I have shown the output of timer 10 as supplied to a pulse modulator 30, which may be constituted by any conventional circuit whereby the pulsed energy delivered by timer 10 is applied to the modulation of a carrier wave of constant frequency having an arbitrary value F1. From the pulse modulator the modulated carrier is supplied through selector switch 13A to F1 transmitter 11, from which it is radiated to F1 receiver 20 at station B1. The equipment necessary at station B1 is merely that required to repeat and retransmit the signals collected by F1 receiver 20. For reasons hereinafter explained, it is desirable to retransmit signals arriving at station B1 on a different carrier frequency, designated F2, and F1 receiver 20 and F2 transmitter 21 at station B1 will, of course, include conventional means for demodulating the received signal and applying the resultant pulsed energy to the modulation of a carrier wave of frequency F2. This modulated wave is radiated to F2 receiver 25 at repeater station B2 and to F2 receiver station 15 at master station M, each of these receivers being tuned to the carrier frequency F2 and being therefore unresponsive to signals received from F1 transmitter 11. The carrier wave arriving at station B2 is demodulated, applied to a carrier wave of frequency F1, and reradiated by F1 transmitter 26 to F1 receiver 20 at station B1 and by F1 receiver 16 at master station M. A time gate circuit 22, hereinafter more fully explained, is also employed at station B2 for suppressing or preventing regenerative transmission of signals between stations B1 and B2, as hereinafter more fully explained.

The modulated carrier wave from pulse modulator 30 may, alternatively, be supplied through terminal 1 of selector switch 13A to F2 transmitter 12 at master station M for radiation to F2 receiver 25 at station B2, whereby signal energy may be transmitted directly from master station M to station B2 and there retransmitted on frequency F1 for reception by F1 receiver 16 at master station M.

The equipment at master station M also includes a suitable indicator 14 of conventional design which is supplied with a selected reference or ranging signal, whereby the time elapsing between transmission of signals from master station M and return of the signals from the repeater stations may be accurately measured. I may employ, for instance, an indicating circuit of the type disclosed in my copending application for U. S. Letters Patent, Serial No. 68,593, filed December 21, 1948. Alternatively, I may employ a cathode ray tube on which is displayed the reference or ranging signal and the returned signal, an adjustable delay circuit, giving a direct indication of the distance traversed by the repeated signal, being employed to bring the ranging and the returned pulses into alignment. The extent of the required adjustment of the delay circuit is thus a measure of lapsed time, and the adjusting means may be calibrated to give a direct reading in terms of distance. One such arrangement is described in my prior application for U. S. Letters Patent, Serial No. 84,360, filed March 30, 1949.

Thus, as illustrated herein, the ranging signal may be supplied through selector switch 13B from any one of the ranging circuits 17, 18 and 19, ranging circuits 17 and 18 being energized directly from timer 10, and ranging circuit 19 being energized from F2 receiver 15 through suitable gating controls, hereinafter described. The signals received at master station M from the repeater stations by F2 receiver 15 and F1 receiver 16 are supplied to the indicator through selector switch 13C. As indicated, selector switches 13A, 13B and 13C are coupled for concurrent operation. The mode of operation of the system as thus far described is as follows.

Assuming that it be desired first to measure the distance $d1$ from master station M to repeater station B1, selector switches 13A, 13B and 13C are set at position 3, F1 transmitter 11, F2 receiver 15, and ranging circuit 17 being thereby rendered operative. The signal transmitted on F1 frequency from transmitter 11 is received at F1 receiver 20 at station B1, converted to carrier frequency F2, reradiated by transmitter 21, and received at F2 receivers 25 at station B2 and 15 at master station M. At station B2, the received signals are applied to carrier frequency F1, reradiated by F1 transmitter 26, and received by F1 receiver 20 at station B1 for reradiation on frequency F2 by transmitter 21 for reception by F2 receiver 15 at master station M. Thus the pulsed signal energy radiated from master station M to station B1 is there received and repeated, being intercepted by receiver 15 at the master station and applied to indicator 14. The ranging circuit 17 also supplies a suitable reference signal to indicator 14 which, by adjustment to coincidence with the pulse derived from the transmission and reradiation just described affords a direct reading of the distance $d1$ between master station M and station B1.

It will be appreciated that the signal energy transmitted from master station M through station B1 to station B2, and back over the same path to master station M arrives at receiver 15 later than the signal directly returned from station B1, since the distance traversed by the former is twice the sum of $d1$ and $d3$. The lapse of time required for transmission of this later arriving signal may now be measured by adjusting selector switches 13A, 13B, and 13C to position 2, whereby transmitter 11 and receiver 15 remain connected as before, but the reference signal is supplied through ranging circuit 19, which is energized by the earlier received signal which has traveled only the path between master station M, repeater station B1, and return. Thus if the time delay in ranging circuit 19 is adjusted until the ranging pulse is in coincidence with the later of the two arriving signals, a direct reading of distance $d3$ will be given, the elapsed time required for travel of signal energy between stations M and B1 being, in effect, eliminated by the energization of ranging circuit 19 by a signal which has traversed that distance.

It will be appreciated that by adjusting selector switches 13A, 13B, and 13C to position 1, F2 transmitter 12 will be energized and F1 receiver 16 and ringing circuit 18 will be connected to the indicator, whereby signal energy will be transmitted from master station M directly to station B2, and will be directly returned, thereby giving a reading of distance $d2$ between the two stations. As explained before, this reading may be employed as a check on the readings previously obtained, even though the position of station B1 with reference to master station M is known, or has been previously measured by optical instrument or otherwise.

In order to obtain a direct reading of distance $d3$ in the manner hereinbefore described, it is essential, of course, that only the signals directly returned from station B1 to master station M be applied to the energizing of the ranging circuit 19, and to screen or eliminate from ranging circuit 19 the later arriving signals which have traversed the total distance $d1+d3$. Again, it is desirable to utilize circuits for this purpose which are capable of minimizing noise, so as to prevent energization of ranging circuit 19 by random energy. To achieve these results, I prefer to employ a gating circuit 50 and a gated pulse amplifier 51, these units being arranged in the system as shown in Figure 2, and being effective to prevent actuation of ranging circuit 19 except during the proper intervals, so as to minimize actuation thereof by energy other than the pulses returned directly from station B1.

Thus referring to Figure 3, illustrating details of a preferred embodiment, it will be noted that unit 50 employs tubes 61 and 62, these tubes being connected in a circuit which may be described as a cathode coupled scale-of-two circuit for actuation in sequence by signals applied separately to the control grids thereof. In other words, tubes 61 and 62 are alternately conducting and nonconducting, as determined by the sequential application of signals to their grids. The circuit constants are such that tube 62 is nonconducting immediately before F1 transmitter 11 is pulsed, while tube 61 is conducting. On the emission of a signal pulse by transmitter 11, the pulse is detected by suitable means, for instance rectifier 64, which may be arranged in a resonant circuit, and the derived pulse is applied across grid resistor 72 to render the grid of tube 62 more positive, thereby initiating conduction in that tube. The resultant voltage fall at the plate of tube 62 is coupled through capacitor 67 and resistor 68 to the grid of tube 61, so that the plate voltage of the latter rises. This voltage rise or positive pulse at the plate of tube 61 is then fed through capacitor 74 to apply a positive potential to the screen grid of tube 75 of gated pulse amplifier 51.

In addition to tube 75, gated amplifier 51 includes as circuit components, cathode resistor 79 and by-pass capacitor 80; screen divider resistors 76 and 77; and plate load resistor 78 and grid resistor 81. The cathode bias on the tube and the effective D. C. screen voltage across resistor 76 are so chosen that, in the non-gated condition, tube 75 will not pass signals applied on its control grid through capacitor 82. Thus signals cannot pass from F2 receiver 15 through capacitor 82 to tube 75 and thence through capacitor 83 to ranging circuit 19 until tube 75 is gated into operation by the signal from circuit 50. When, however, a positive gating signal, generated in circuit 50 in response to pulsing of F1 transmitter 11, is applied to the screen grid of tube 75, the latter becomes operative to pass signals from receiver 15. The first returned signal of appreciable magnitude arriving thereafter at receiver 15 will be the pulse representative of distance $d1$, and this signal is applied to the control grid of tube 75 to energize ranging circuit 19 through capacitor 83. At the instant circuit 19 is energized, the signal is also applied through capacitor 63 to tube 61. This initiates conduction in tube 61, resulting in a voltage fall at its plate and terminating the gating pulse applied by circuit 50 to tube 75, whereby the latter is rendered inoperative. Simultaneously, this voltage fall at the plate of tube 61 is applied through capacitor 65 and resistor 66 to the grid of tube 62, returning the latter to its original state of nonconduction, and thus preparing it for actuation by the next succeeding pulse derived from F1 transmitter 11.

The sequence of operations just described is illustrated in graphic form in Figure 5. Thus, the cycle of operations begins, as shown in graph I, with the transmission of a pulse from F1 transmitter 11. At that instant gate 51 is rendered operative as shown in graph II, and on arrival of the first returned pulse at F2 receiver 15, ranging circuit 19 is energized. Immediately thereafter, gate 51 is rendered inoperative, and remains so until the next pulse is radiated from F1 transmitter 11. Consequently neither the arrival at F2 receiver 15 of the later pulse which has traveled the entire distance to station B2 and return, nor echoes which may follow the arrival of pulses, is able to actuate ranging circuit 19. As shown on graph I, echoes of appreciable magnitude are not received after transmission of a pulse from F1 transmitter 11, since F2 receiver 15 is not tuned to the frequency of the transmitter, and any direct effect from the transmitter is negligible.

In Figure 4 is shown a circuit suitable for use as a time gate at station B2, for the purpose of preventing regenerative transmission between stations B1 and B2, as hereinbefore mentioned. Thus vacuum tube 100, transformer 101 and the associated components comprise a blocking oscillator which performs the dual function of providing a driving pulse for transmitter 26 and operating as a time gate 22 to suppress regenerative pulsing between stations B1 and B2. Transformer 101 is so connected with tube 100 as to afford single pulse output when a trigger signal from receiver 25 is applied through coupling capacitor 104. The grid of tube 100 is normally biased below cut-off by a positive voltage on the cathode impressed by the network 105 and 107, capacitor 106 serving to by-pass resistor 105 effectively. Capacitor 108 and resistor 109 are employed for decoupling purposes. When a trigger pulse is impressed on input capacitor 104, regenerative action occurs, as described at length in my copending application for U. S. Letters Patent, Serial No. 92,884, filed May 12, 1949, and a single pulse output is furnished from transformer 100 so as to excite the R. F. oscillator or amplifier in transmitter 26. Now the recovery time of the blocking oscillator, as illustrated in the waveform associated with the grid, may be adjusted by selection of 103 and 102 so as to form a time gate which effectively prevents received pulses from triggering the circuit except at the proper pulse rate. Thus the time of recovery may be arranged so that unwanted pulses, such as the retriggered pulse from B1 which occurs at time $t$, will not trigger the blocking oscillator. By time T, however, the circuit has fully recovered so as to be responsive to the next proper trigger pulse at the proper pulse rate established by timer 10 in master station M.

Other circuits may be employed for the purpose, but I prefer that shown in Figure 3 for its simplicity and effectiveness. For instance, under certain conditions of operation and especially where the received signal-to-noise ratio is low, the circuit of Figure 6 is preferable. In this figure, $d3$ ranging circuit 19 is triggered by the range pulse output from $d1$ ranging circuit 17, thus automatically providing subtraction of $d1$ from the $d1+d3$ received signal. The dial on $d3$ ranging circuit 19 then yields the value of distance $d3$ directly. It will be appreciated that the output of $d1$ ranging circuit 17 is free from noise since this circuit is not actuated by the F2 receiver 15 and therefore does not pick up the usual atmospheric interferences. It is first necessary to set $d1$ ranging circuit 17 properly before $d3$ ranging circuit is adjusted, and in this respect the circuit of Figure 6 is not so simple to operate as that previously described, but the freedom from noise is distinctly advantageous under certain conditions.

It will be appreciated that the system described herein affords an effective method of measuring, by direct transmission and return of the signal, the distance between the master station and each of the two remote stations, and by transmission of the signal from the master station through the first remote station to the second remote station and return, the distance between the two remote stations. As a check on these measurements, a signal may be transmitted over the full perimeter of the triangle, the signal being transmitted from master station M to repeater station B1 to repeater station B2, from which it is directly returned to master station M, and the total distance determined from the travel time. It will also be understood that the method of determining the distance between two remote stations described herein may be effectively employed in a system involving the use of additional repeater stations, for instance, a system employing three repeater stations and a master station, so that the transmission paths define a quadrilateral figure. In such a system, the procedure outlined herein may readily be employed to determine the length of the two remote sides of the figure, the two sides of the figure adjacent the master station being measured by direct transmission and retransmission.

Various other fields of use of the invention will be apparent to those skilled in the art, for instance the determination of the instantaneous position of remote moving stations, such as aircraft, ships and land vehicles. All such useful aspects and applications of the inventive principle illustrated herein are contemplated as part of the invention defined more particularly hereinafter.

Having thus described the invention, what is claimed as new and desired to be secured by Letters Patent is:

1. A system for measuring at a base point the distance between two remote points comprising, in combination, a master station located at said base point and a repeater station located at each of said remote points; each station including a transmitter and a receiver, means at each of said repeater stations connecting the transmitter and receiver to effect reradiation by the transmitter of signals arriving at the receiver; the transmitter at said master station, the receiver at the first of said repeater stations, and the transmitter at the second of said repeater stations being tuned to a first frequency; the receiver at said master station, the transmitter at the first of said repeater stations and the receiver at the second of said repeater stations being tuned to a second frequency; whereby signals transmitted from said master station are initially received only at the first of said repeater stations; signals reradiated from the second of said repeater stations are initially received only at the first of said repeater stations; and signals reradiated from the first of said repeater stations are received at both said master station and the second of said repeater stations; so that signals transmitted from said master station are returned directly to said master station from the first of said repeater stations, and are concurrently reradiated to the second of said repeater stations, returned to the first of said repeater stations and thence to said master station; and means at said master station for measuring the lapsed time between the arrival at said master station of signals returned directly from the first of said repeater stations and of signals returned from the second of said repeater stations through the first of said repeater stations to said master station.

2. A system for measuring at a base pont the distance between two remote points comprising, in combination, a master station located at said base point and a repeater station located at each of said remote points; each station including a transmitter and a receiver; means at each of said repeater stations connecting the transmitter and receiver to effect reradiation by the transmitter of signals arriving at the receiver; means for receiving signals from said master station only at the first of said repeater stations, means receiving at the first of said repeater stations only signals reradiated from the second of said repeater stations; and means receiving at both said master station and the second of said repeater station signals reradiated from the first of said repeater stations; so that signals transmitted from said master station are returned directly to said master station from the first of said repeater stations, and are concurrently reradiated to the second of said repeater stations, returned to the first of said repeater stations and thence to said master station; and means at said master station for measuring the lapsed time between the initial arrival at said master station of signals returned directly from the first of said repeater stations and the later arrival of signals returned from the second of said repeater stations through the first of said repeater stations to said master station.

3. A system for measuring at a base point the distance between two remote points comprising, in combination, a master station located at said base point and a repeater station located at each of said remote points; each station including a transmitter and a receiver; means at each of said repeater stations connecting the transmitter and receiver to effect reradiation by the transmitter of signals arriving at the receiver; means for receiving signals from said master station only at the first of said repeater stations, means receiving at the first of said repeater stations only signals reradiated from the second of said repeater stations, and means receiving at both said master station and the second of said repeater station signals reradiated from the first of said repeater stations; so that signals transmitted from said master station are returned directly to said master station from the first of said repeater stations, and are concurrently reradiated to the second of said repeater stations, returned to the first of said repeater stations and thence to said master station; and means at said master station for measuring the lapsed time between the initial arrival at said master station of signals returned directly from the first of said repeater stations and the later arrival of signals returned from the second of said repeater stations through the first of said repeater stations to said master station, said last named means comprising an indicator, devices responsive to signal energy returned directly from the first of said repeater stations for supplying a reference pulse to said indicator, devices responsive to signal energy returned from the second of said repeater stations for supplying a signal pulse to said indicator, and means associated with said first named devices for preventing actuation thereof in response to signal energy returned from the second of said repeater stations.

4. A system for measuring at a base point the distance between two remote points comprising, in combination, a master station located at said base point and a repeater station located at each of said remote points; each station including a transmitter and a receiver; means at each of said repeater stations connecting the transmitter and receiver to effect reradiation by the transmitter of signals arriving at the receiver; means for receiving signals from said master station only at the first of said repeater stations, means receiving at the first of said repeater stations only signals reradiated from the second of said repeater stations, and means receiving at both said master station and the second of said repeater station signals reradiated from the first of said repeater stations; so that signals transmitted from said master station are returned directly to said master station from the first of said repeater stations, and are concurrently reradiated to the second of said repeater stations, returned to the first of said repeater stations and thence to said master station; and means at said master station for measuring the lapsed time between the initial arrival at said master station of signals returned directly from the first of said repeater stations and the later arrival of signals returned from the second of said repeater stations through the first of said repeater stations to said master station, and devices at the second of said repeater stations for preventing reradiation by its transmitter of signals previously received and reradiated from said stations, whereby regenerative action between said repeater stations is minimized.

5. A system for measuring at a base point the distance between two remote points comprising, in combination, a master station located at said base point and a repeater station located at each of said remote points; each station including a transmitter and a receiver, means at each of said repeater stations connecting the transmitter and receiver to effect reradiation by the transmitter of signals arriving at the receiver; the transmitter at said master station, the receiver at the first of said repeater stations, and the transmitter at the second of said repeater stations being tuned to a first frequency; the receiver at said master station, the transmitter at the first of said repeater stations and the receiver at the second of said repeater stations being tuned to a second frequency; whereby signals transmitted from said master station are initially received only at the first of said repeater stations, signals reradiated from the second of said repeater stations are initially received only at the first of said repeater stations, and signals reradiated from the first of said repeater stations are received at both said master station and the second of said repeater stations; so that signals transmitted from said master station are returned directly to said master station from the first of said repeater stations, and are concurrently reradiated to the second of said repeater stations, returned to the first of said repeater stations and thence to said master station; and means at said master station for measuring the lapsed time between the arrival at said master station of signals returned directly from the first master station of signals returned directly from the first of said repeater stations and of signals returned from the second of said repeater stations through the first of said repeater stations to said master station, a second transmitter and a second receiver at said master station, said first and second transmitters being selectively and alternately operable, said second transmitter operating on said second frequency and said second receiver being tuned to said first frequency, whereby signals radiated by said second transmitter are received and returned directly to said master station by the second of said repeater stations for measurement of the distance therebetween.

6. A system for measuring at a base point the distance between two remote points comprising, in combination, a master station located at said base point and a repeater station located at each of said remote points; each station including a transmitter and a receiver, means at each of said repeater stations connecting the transmitter and receiver to effect reradiation by the transmitter of signals arriving at the receiver, the transmitter at said master station, the receiver at the first of said repeater stations, and the transmitter at the second of said repeater stations being tuned to a first frequency; the receiver at said master station, the transmitter at the first of said repeater stations and the receiver at the second of said repeater stations being tuned to a second frequency; whereby signals transmitted from said master station are initially received only at the first of said repeater stations, signals reradiated from the second of said repeater stations are initially received only at the first of said repeater stations, and signals reradiated from the first of said repeater stations are received at both said master station and the second of said repeater stations; so that signals transmitted from said master station are returned directly to said master station from the first of said repeater stations, and are concurrently reradiated to the second of said repeater stations, returned to the first of said repeater stations and thence to said master station; and means at said master station for measuring the periods of elapsed time between transmission of signals from the master station, the arrival at said master station of signals returned directly from the first of said repeater stations, and the arrival of signals returned from the second of said repeater stations to said master station through the first of said repeater stations, said last named means comprising an indicator, and devices supplying to said indicator signal pulses indicative of the time of (1) signal transmission from said master station, (2) arrival at said master station of directly returned signals, and (3) arrival at said master station of signals returned from the second of said repeater stations.

References Cited in the file of this patent

UNITED STATES PATENTS

| | | |
|---|---|---|
| 2,405,238 | Seeley | Aug. 6, 1946 |
| 2,408,048 | Deloraine et al. | Sept. 24, 1946 |
| 2,441,956 | Deloraine et al. | May 25, 1948 |
| 2,470,787 | Nosker | May 24, 1949 |
| 2,515,332 | Budenbom | July 18, 1950 |
| 2,531,412 | Deloraine | Nov. 28, 1950 |
| 2,536,728 | De Saint-Exupery | Jan. 2, 1951 |
| 2,546,970 | Busignies | Apr. 3, 1951 |